US011822590B2

(12) United States Patent
Sengupta et al.

(10) Patent No.: US 11,822,590 B2
(45) Date of Patent: Nov. 21, 2023

(54) METHOD AND SYSTEM FOR DETECTION OF MISINFORMATION

(71) Applicant: Accenture Global Solutions Limited, Dublin (IE)

(72) Inventors: Shubhashis Sengupta, Bangalore (IN); Milind Savagaonkar, Bangalore (IN); Nidhi, New Delhi (IN); Tanmoy Chakraborty, New Delhi (IN); William Scott Paka, Kakinada (IN); Rachit Bansal, New Delhi (IN)

(73) Assignee: Accenture Global Solutions Limited, Dublin (IE)

( * ) Notice: Subject to any disclaimer, the term of this patent is extended or adjusted under 35 U.S.C. 154(b) by 182 days.

(21) Appl. No.: 17/501,195

(22) Filed: Oct. 14, 2021

(65) Prior Publication Data

US 2022/0382795 A1 Dec. 1, 2022

(30) Foreign Application Priority Data

May 18, 2021 (IN) .............................. 202141022247

(51) Int. Cl.
*G06F 16/35* (2019.01)
*G06N 3/088* (2023.01)
*G06F 16/953* (2019.01)
*G06F 40/30* (2020.01)
*G06F 18/2431* (2023.01)

(52) U.S. Cl.
CPC .......... *G06F 16/353* (2019.01); *G06F 16/953* (2019.01); *G06F 18/2431* (2023.01); *G06F 40/30* (2020.01); *G06N 3/088* (2013.01)

(58) Field of Classification Search
CPC .............................. G06F 16/353; G06F 16/953
See application file for complete search history.

(56) References Cited

U.S. PATENT DOCUMENTS

2013/0124545 A1* 5/2013 Holmberg ............... G06F 16/50
707/769
2021/0191925 A1* 6/2021 Sianez .................. G06N 20/00

OTHER PUBLICATIONS

William Scott Paka et al., "Cross-SEAN: A Cross-Stitch Semi-Supervised Neural Attention Model for COVID-19 Fake News Detection", published Aug. 2021; https://arxiv.org/pdf/2102.08924.pdf [retrieved Jul. 15, 2022].

(Continued)

*Primary Examiner* — Baoquoc N To
(74) *Attorney, Agent, or Firm* — Plumsea Law Group, LLC

(57) ABSTRACT

A system and method for automatically detecting misinformation is disclosed. The misinformation detection system is implemented using a cross-stitch based semi-supervised end-to-end neural attention model which is configured to leverage the large amount of unlabeled data that is available. In one embodiment, the model can at least partially generalize and identify emerging misinformation as it learns from an array of relevant external knowledge. Embodiments of the proposed system rely on heterogeneous information such as a social media post's text content, user details, and activity around the post, as well as external knowledge from the web, to identify whether the content includes misinformation. The results of the model are produced via an attention mechanism.

20 Claims, 11 Drawing Sheets

(56) References Cited

OTHER PUBLICATIONS

Aditi Gupta et al., "TweetCred: Real-Time Credibility Assessment of Content on Twitter", published Nov. 2014, In International Conference on Social Informatics, Springer, 2014, pp. 228-243. ; https://arxiv.org/pdf/1405.5490.pdf [retrieved Jul. 15, 2022].
Tong Chen et al., "Call Attention to Rumors: Deep Attention Based Recurrent Neural Networks for Early Rumor Detection" published Jun. 2018, In Pacific-Asia Conference on Knowledge Discovery and Data Mining, Springer, 2018, pp. 40-52. ; https://arxiv.org/pdf/1704.05973.pdf [retrieved Jul. 15, 2022].
S. R. Sahoo et al., "Multiple features based approach for automatic fake news detection on social networks using deep learning" published Mar. 2021, In Applied Soft Computing 100, 2021.
Y. Liu et al. , "Early Detection of Fake News on Social Media Through Propagation Path Classification with Recurrent and Convolutional Networks" published Apr. 4, 2018, In Proceedings of the AAAI Conference on Artificial Intelligence, pp. 354-361. ; file:///C:/Users/Emily.Fisher/Downloads/11268-Article%20Text-14796-1-2-20201228.pdf [ Retrieved Jul. 15, 2022].
Rohit Kumar Kaliyar et al., "FNDNet—A deep convolutional neural network for fake news detection" publsihed Jan. 2020, In Cognitive Systems Research. https://www.sciencedirect.com/science/article/abs/pii/S1389041720300085 [retreived Jul. 15, 2020].
Bhaye Malhotra et al., "Classification of Propagation Path and Tweets for Rumor Detection using Graphical Convolutional Networks and Transformer based Encodings" published Sep. 2020, In 2020 IEEE Sixth International Conference on Multimedia Big Data (BigMM), pp. 183-190.
Hadeer Ahmed et al., "Detecting opinion spams and fake news using text classification" published Nov. 2017; https://sci-hub.ru/10.1002/spy2.9 [retrived Jul. 18, 2022].
Mykhailo Granik et al., "Fake news detection using naive Bayes classifier" published May 2017, In 2017 IEEE First Ukraine Conference on Electrical and Computer Engineering (UKRCON), 2017, pp. 900-903.

Feyza Altunbey Ozbay at el.,"Fake news detection within online social media using supervised artificial intelligence algorithms" published Feb. 2020, In Physica A: Statistical Mechanics and its Applications, Elsevier, vol. 540(C).
Xinyi Zhou et al., "SAFE: Similarity-Aware Multi-Modal Fake News Detection" published May 2020, In Pacific-Asia Conference on Knowledge Discovery and Data Mining, Springer, 2020, pp. 354-367. ; https://arxiv.org/pdf/2003.04981.pdf [retrieved Jul. 15, 2022].
Stephan Helmstetter et al., "Weakly Supervised Learning for Fake News Detection on Twitter" published Aug. 2018, In 2018 IEEE/ACM International Conference on Advances in Social Networks Analysis and Mining (ASONAM), pp. 274-277. ; http://data.dws.informatik.uni-mannheim.de/fakenews/asonam_short.pdf [ retrieved Jul. 15, 2022].
Xishuang Dong et al., "Two-Path Deep Semi-supervised Learning for Timely Fake News Detection" published Dec. 2020, In IEEE Transactions on Computational Social Systems, vol. 7, Issue 6, pp. 1386-1398. ; https://arxiv.org/pdf/2002.00763.pdf [retrieved Jul. 15, 2022].
Takeru Miyato et al., "Adversarial Training Methods for Semi-Supervised Text Classification" published Apr. 2017, https://arxiv.org/pdf/1605.07725.pdf [retrieved Jul. 15, 2022].
Nilsa Reimers et al., "Sentence-BERT: Sentence Embeddings using Siamese BERT-Networks" published Nov. 2019, in: Proceedings of the 2019 Conference on Empirical Methods In Natural Language Processing and the 9th International Joint Conference on Natural Language Processing (EMNLP-IJCNLP), Association for Computational Linguistics, Hong Kong, China, 2019, pp. 3982-3992. ; https://aclanthology.org/D19-1410.pdf [retrived Jul. 15, 2022].
Sneha Singhania et al., "3HAN: A Deep Neural Network for Fake News Detection", published Nov. 2017, In International Conference on Neural Information Processing, Springer, 2017, pp. 572-581. ; http://infosource.biz/srao/papers/3han.pdf [retrieved Jul. 15, 2022].
Natali Ruchansky et al., "CSI: A Hybrid Deep Model for Fake News Detection" published Nov. 2017, In Proceedings of the 2017 ACM on Conference on Information and Knowledge Management, 2017, pp. 797-806. ; https://arxiv.org/pdf/1703.06959.pdf [retrived Jul. 15, 20222].

* cited by examiner

METHOD AND SYSTEM FOR DETECTION OF MISINFORMATION

TECHNICAL FIELD

The present disclosure generally relates to the detection of misinformation.

BACKGROUND

Deliberate misinformation may be written and published with the intent to mislead in order to damage an agency, entity, or person, and/or gain financially or politically, often with sensationalist, exaggerated, or patently false headlines that grab attention. Thus, this misinformation undermines serious media coverage and often makes it more difficult for journalists to cover significant news stories.

Any single false news item that gains traction can negate the significance of a body of verified facts. Therefore, there is an immediate need to detect the misinformation and prevent their spread. However, the current models to detect misinformation do not make use of multiple contextual features and rely on having vast sets of labelled data. These models are also ill-suited for use in situations in which classifications beyond the available training data are needed.

There is a need in the art for a system and method that addresses the shortcomings discussed above.

SUMMARY

A system and method for classifying media content online via a cross-stitch based semi-supervised attention neural model ("verification model") are disclosed. The verification model works using a semi-supervised learning process that is capable of leveraging vast amounts of unlabeled social media data to learn the general writing style of posts, such as Tweets®. The model takes inputs including user metadata, media post metadata, and external knowledge into consideration, as well as the extracted text of the media post. A cross-stitch neural network model identifies an optimal combination of the model inputs. This optimal combination is used to determine which section of the network will process each input, thereby enhancing the accuracy of classifications of media content made by the model. Upon receiving a verification request, the raw data is first transformed to the necessary format and then passed through the model. The determined classification along with its confidence from the Softmax layer is returned. In some cases, verification of the content takes an average of 1.2 seconds or less.

In one aspect, the disclosure provides a computer-implemented method of classifying online media content as either true or false using a cross-stitch neural network model. The method includes a first step of receiving, from a computing device and at a cloud-based server, a first request for verification of a first content, and a second step of extracting, at the server, text from the first content. A third step includes passing the text as an input to a cross-stitch neural network model at the server, and a fourth step includes processing, via text processing techniques associated with or provided by the cross-stitch neural network model, the text to obtain a shortened contextual form of the text. The method also includes a fifth step of generating, via the cross-stitch neural network model, a query based on the shortened contextual form, a sixth step of submitting, from the server, the query to a web-search engine, and a seventh step of retrieving, from the web-search engine and via the server, external data comprising a plurality of text sentences similar to the text. In addition, the method includes an eighth step of classifying, via the cross-stitch neural network model, the text as either true or false based on the external data, and a ninth step of presenting, at a display for the computing device, the classification of the text.

In another aspect, the disclosure provides a non-transitory computer-readable medium storing software comprising instructions executable by one or more computers which, upon such execution, cause the one or more computers to: (1) receive, from a computing device and at a cloud-based server, a first request for verification of a first content; (2) extract, at the server, text from the first content; (3) pass the text as an input to a cross-stitch neural network model at the server; (4) process, via text processing techniques of the cross-stitch neural network model, the text to obtain a shortened contextual form of the text; (5) generate, via the cross-stitch neural network model, a query based on the shortened contextual form; (6) submit, from the server, the query to a web-search engine; (7) retrieve, from the web-search engine and via the server, external data comprising a plurality of text sentences similar to the text; (8) classify, via the cross-stitch neural network model, the text as either true or false based on the external data; and (9) present, at a display for the computing device, the classification of the text.

In another aspect, the disclosure provides a system for classifying online media content as either true or false using a cross-stitch neural network model, the system comprising one or more computers and one or more storage devices storing instructions that are operable, when executed by the one or more computers, to cause the one or more computers to: (1) receive, from a computing device and at a cloud-based server, a first request for verification of a first content; (2) extract, at the server, text from the first content; (3) pass the text as an input to a cross-stitch neural network model at the server; (4) process, via text processing techniques of the cross-stitch neural network model, the text to obtain a shortened contextual form of the text; (5) generate, via the cross-stitch neural network model, a query based on the shortened contextual form; (6) submit, from the server, the query to a web-search engine; (7) retrieve, from the web-search engine and via the server, external data comprising a plurality of text sentences similar to the text; (8) classify, via the cross-stitch neural network model, the text as either true or false based on the external data; and (9) present, at a display for the computing device, the classification of the text.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The increase in accessibility to the Internet has dramatically changed the way society communicates and shares ideas. Social media consumption is one of the most popular activities that occur online. Indeed, it has become a trend to rely on such platforms for news updates. However, due to the absence of any 'verification barrier' misinformation often replaces actual news reports. As a general matter, a news article that is intentionally and verifiably false and deceptive in nature, or any other article or message published and propagated through online media platforms that carry false information regardless of the means and motives behind it, may be understood to fall under the umbrella of false news and misinformation. Any single false news that gains enormous traction can negate the significance of a body of verified facts. For example, when a Tweet® with misinformation is retweeted by an influential person or by a verified account, what should have been a marginal impact grows exponentially. The analysis, identification, and elimination of misinformation has become a task of utmost importance. Therefore, there is an immediate need to detect the misinformation and stop their spreading.

As will be described herein, the proposed embodiments offer a mechanism by which misinformation may be automatically detected in order to alert readers of the potential danger. In some embodiments, a misinformation detection system is implemented using a custom-designed model, herein referred to as a verification model. Embodiments of the verification model include a cross-stitch based semi-supervised end-to-end neural attention model which is configured to leverage the large amount of unlabeled data that is available. Techniques employing cross-stitch networks start out with two separate model architectures (similar to soft parameter sharing). The two architectures then use what is referred to as cross-stitch units to allow the model to determine in what way the task-specific networks leverage the knowledge of the other task by learning a linear combination of the output of the previous layers. In one embodiment, the verification model can at least partially generalize and identify emerging misinformation as it learns from an array of relevant external knowledge. Embodiments of the proposed system rely on heterogeneous information such as text of the posting content (e.g., Tweets®), user details, and activity around the post, as well as external knowledge from the web, to identify misinformation which may not immediately appear to be fake from the heterogeneous data. In some embodiments, a verification model-based web-browser extension for real-time detection of fake posts can also be provided to allow users to more easily apply the model to their internet activity. Furthermore, in one embodiment, the model can intelligently incorporate online learning based on user feedback.

Figure 1A:
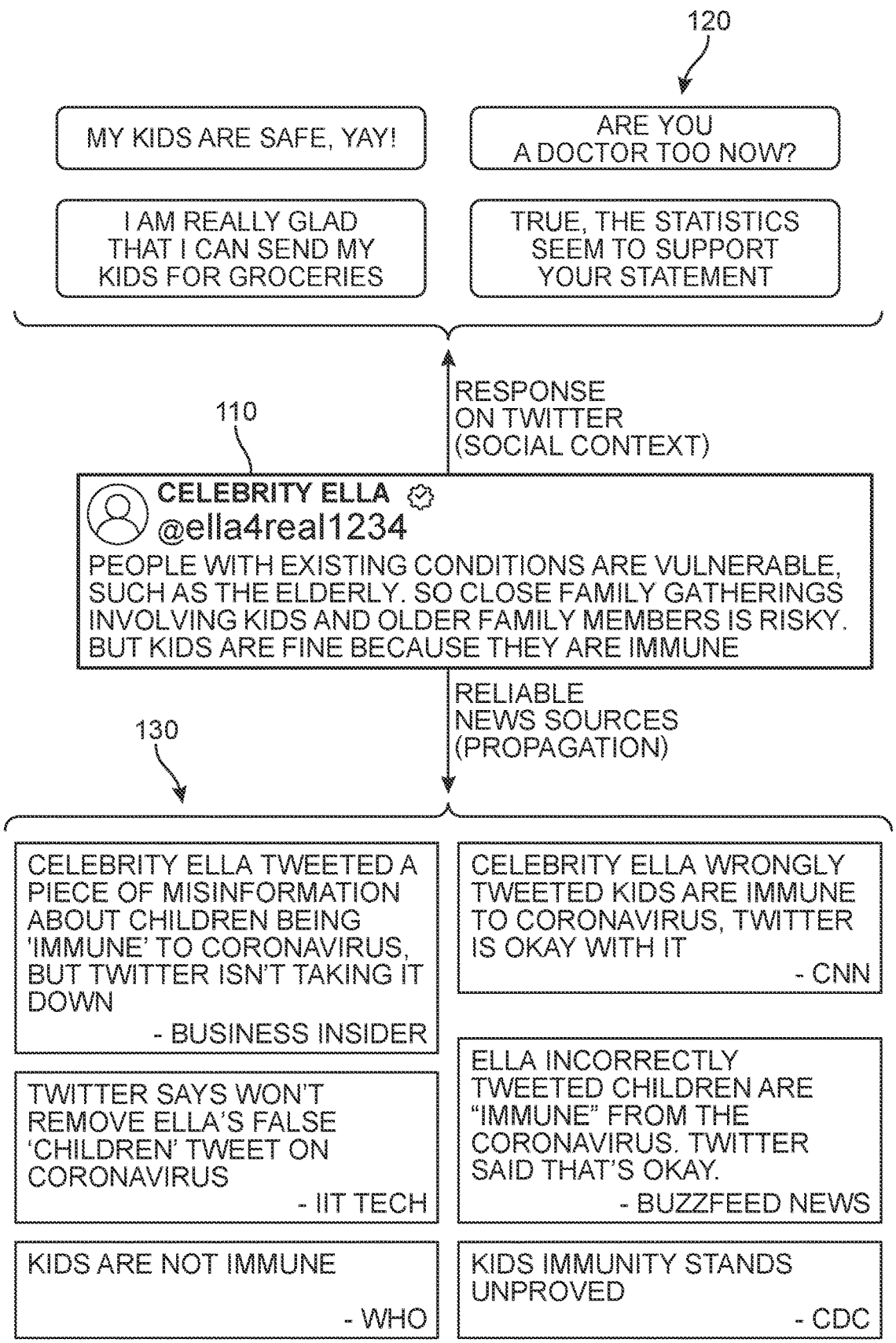
FIGS. 1A and 1B depict an example of a fake-news posting on Twitter® and an application of the proposed system for classifying the content as false, according to an embodiment.

Referring to FIG. 1A, an example of the repercussions of false information is presented involving the social media platform Twitter®. In FIG. 1A, it can be seen that a verified user such as a celebrity (e.g., "Celebrity Ella") posted a Tweet® 110 stating that "Kids are fine because they are immune", to which many readers responded with messages 120 affirming this belief. Public health experts later released a statement debunking this claim. Meanwhile, reliable news sources, while reporting the inaccuracy of Celebrity Ella's Tweet® 110, nevertheless further publicized the misinformation with their coverage 130.

Figure 1B:
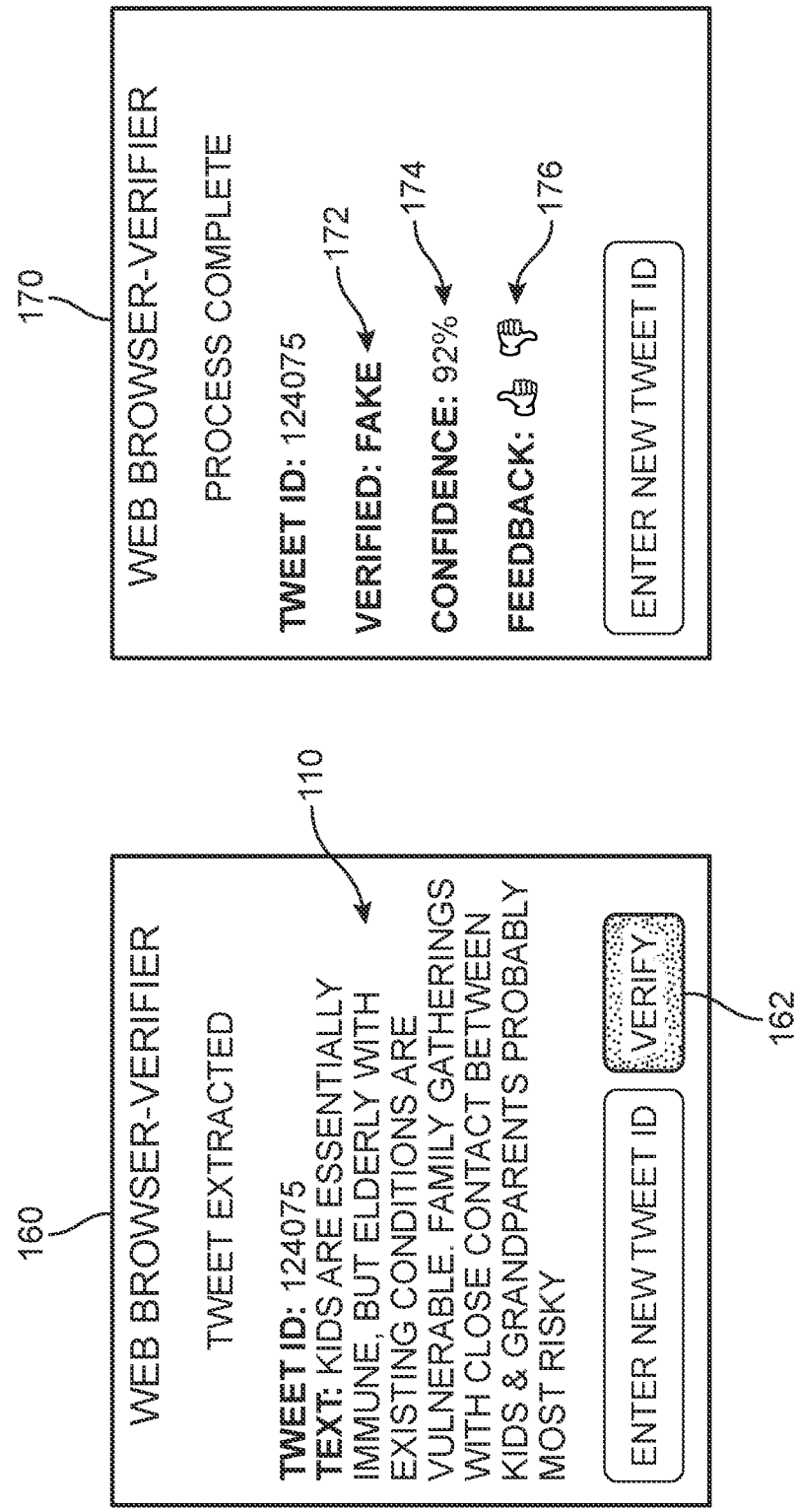

In different embodiments, the proposed system can be implemented by the use of a web-based extension, as shown in FIG. 1B, for determining whether a post made on, for example, Twitter®, Facebook®, Instagram®, REDDIT, and other internet-based media exchange platforms etc. is grounded in truth. In the following examples, Tweets® will be described as the target input for the model, but it should be understood that in different embodiments, any other content can be processed using the proposed techniques to detect whether the content is 'fake' or truth. In this case, the Tweet® has been selected for extraction in a first stage 160, for example by input of the Tweet® id number. Once a user clicks on a "Verify" button 162 the system initiates its analysis of the content of the Tweet®. In a second stage 170, the content of the window is replaced by a message indicating the system's determination on the content of the Tweet®. In this case, a verification state 172 is "fake". In some embodiments, the system can also be configured to display its confidence level 174 with respect to its decision (here shown as 92%). Furthermore, as will be discussed below, in different embodiments, the system can invite feedback 176 regarding the verification state that was output, which can be used to improve the accuracy of the system.

Figure 2:
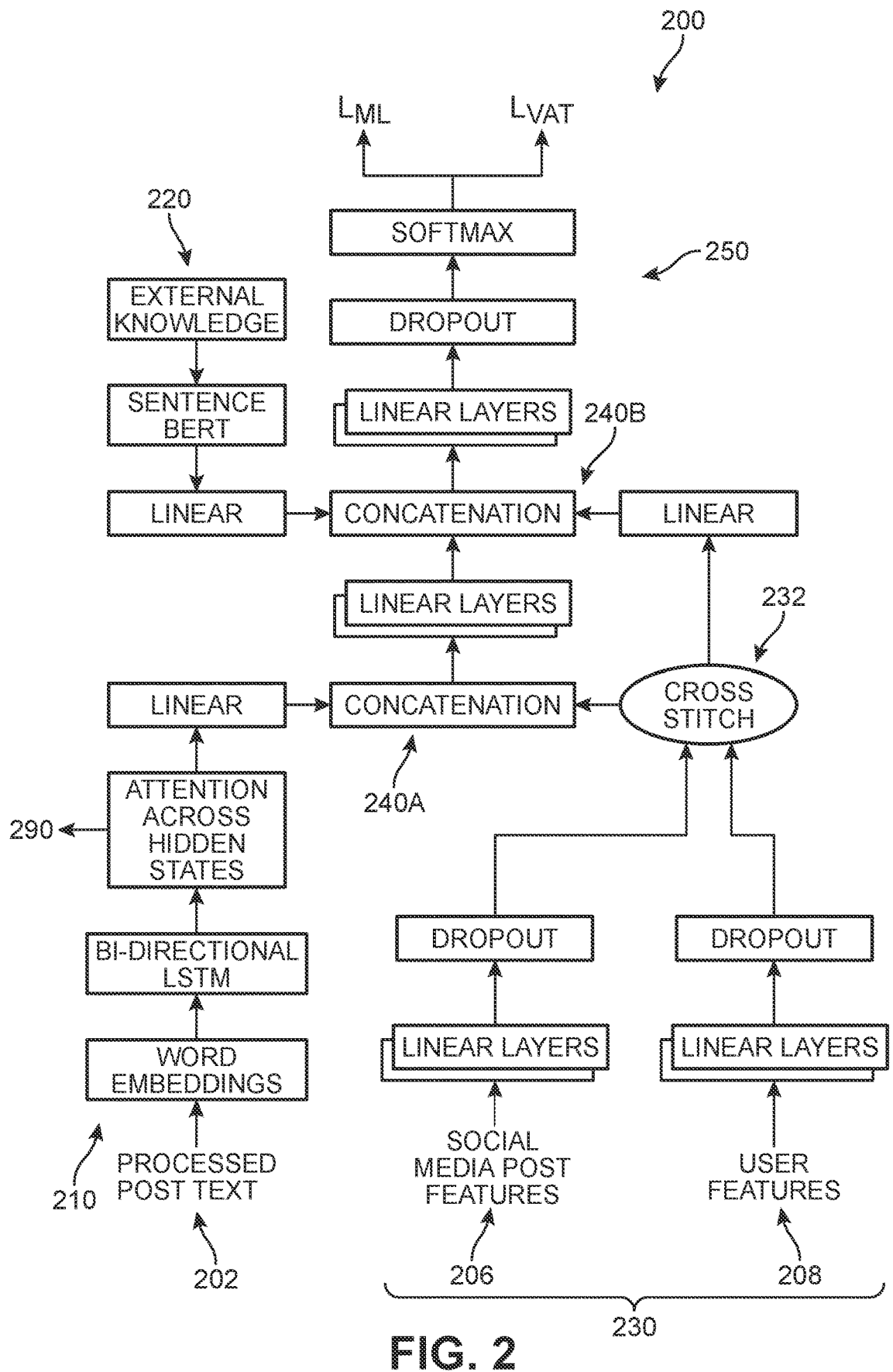
FIG. 2 is a schematic diagram of an overview of a false claim detection model architecture, according to an embodiment.

Referring to FIG. 2, an embodiment of a model architecture 200 of the proposed system is shown, including various components as well as aspects of the training modules. As noted above, the system comprises a cross-stitch based semi-supervised attention neural model. The verification model operates as a semi-supervised model, leveraging the vast amount of unlabeled data to learn the writing style of posts in general. The model considers factors such as user (post author) metadata, social media platform metadata, and external knowledge, in addition to text of the posting content as its inputs. External knowledge is collected in the form of stances close to the social media postings or simply 'posts' (e.g., Tweets®) from trusted domains. A cross-stitch mechanism is used to determine the optimal combination or ratio of model parameters that are used to pass the inputs to various sections of the network. Attention mechanisms have the ability of 'attending to' particular parts of the input when processing the data, enabling the verification model to be capable of representing the words which are being concentrated on for a given post's text. When compared with conventional misinformation detection models, the verification model achieved a 0.95 F1 Score on the dataset, outperforming seven baselines by at least 9%.

In general, content including misinformation or propagation in isolation has been shown to be insufficient for neural models to detect misinformation. Hence, in some embodiments, additional features related to both the users and posts along with the content of the posts were included in the dataset. For the post features (TFs), the attributes available in the post object and some handcrafted features from the post, amounting to a total of 10 features, were included. The ten features included (1) number of hashtags; (2) number of favorites; (3) number of reposts; (4) repost status; (5) number of URLs present; (6) average domain score of the URL(s); (7) number of user mentions; (8) media count in the post; (9) sentiment of the post's text; and (10) counts of various part-of-speech tags and counts of various linguistic sub-entities.

Eight features for each corresponding user (UFs) were extracted, including (1) verified status; (2) follower count; (3) favorites count; (4) number of posts; (5) recent posts per week; (6) length of description; (7) presence of URLs; and (8) average duration between successive posts. These features can provide additional information of the users' characteristics and their activities. Such features not only help the model identify bots and malicious fake accounts, but also allow the model to recognize a pattern amongst users who post false and unverified information. Thus, in some embodiments, these features are further used in the classification process. Furthermore, it is understood that feature-based neural models learn a generalized function from a limited manifold of the training data, and thus have a tendency to perform poorly when the topics are variant. To overcome this, external knowledge for the content relating to the post's text was also used as an input to embodiments of the verification model. For example, external knowledge may provide additional information for the content relating to the post's text, which is then included as an input to the model.

In one example, classical text processing techniques are implemented to obtain a shortened contextual form of the post's text and use it as a query to retrieve the top Google Search results, sorted in accordance to relevance. In some embodiments, various automated processes of analyzing and sorting unstructured text data using natural language processing (NLP) and machine learning, subfields of artificial intelligence, text processing tools are able to automatically understand human language and extract value from text data can be used. Some of these techniques can include statistical methods (e.g., frequency distribution, collocation, concordance, and TF-IDF), text classification models such as topic analysis, sentiment analysis, intent detection and language classification, and text extraction tools based on keywords, entities, client names, product details, dates, prices, or any other information within data.

From each web-article returned from the search, a particular number of text sentences are retrieved which are the closest to the original post text, as measured using cosine similarity of the BERT Sentence Embeddings of the two. This is done until k (=10, by default) sentences are retrieved for the post. In addition, in some embodiments, a portion of the unlabeled data is used to fine-tune word embeddings and encode the post text. Such a process facilitates the model's learning of linguistic, syntactic and contextual composition of the domain data. The remaining portion of unlabeled data can then be used for unsupervised training via additional adversarial loss, which was shown to reduce stochasticity and increase the robustness of the model.

In different embodiments, the model (depicted in architecture 200 of FIG. 2) is configured to receive four types of input (i.e., post text 202, external knowledge post, post features 206, and user features 208). As shown in FIG. 2, in a first stage 210, the model encodes textual data to generate encoded representations of the post text 202 and, in a second stage 220, the external knowledge input 204. In a third stage 230, the model encodes the post and user features. In a fourth stage (240a and 240b), the transformed feature vectors of the post text and post features are concatenated to produce a concatenated representation of all textual features. Affine transformations of the three vectors ((1) the concatenated representation of all textual features; (2) encoded external knowledge; and (3) the output of the cross-stitch from the second stage) are performed through separate feed-forward linear layers and concatenated to obtain the final decoded vector, effectively containing transformed feature representations from all the inputs. The vector is then down-scaled using a fully-connected network in a fifth stage 250 and regularized using dropout before finally obtaining the probability distribution across the two classes.

Thus, in different embodiments, the model can be configured to apply cross-stitch units for optimal sharing of parameters among post features and user features. As post text and post features are closely related, optimal sharing of information occurs by concatenating one output of cross-stitch early in the network and the other later. In some embodiments, maximum likelihood and adversarial training can be used for supervised loss, while virtual adversarial training can be used for unsupervised loss. The usage of adversarial losses can further add regularization and robustness to the model. Thus, the proposed systems represent a novel cross-stitch model which performs under a semi-supervised setting by leveraging both unlabeled and labeled data with optimal data sharing across various types of post information and features.

Further detail regarding the above process is now discussed with reference to FIGS. 2-4. In order to train the model, training data composed of labelled and unlabeled samples, denoted by $X_L$ and $X_U$ respectively, was obtained. $X_L$ consists of a total of $n_L$ data points: $(x_L^1, y_L^1)$, $(x_L^2, y_L^2)$, ...., $(x_L^{n_L}, y_L^{n_L})$ where $x_L^i$ is the $i^{th}$ post and $y_L^i$ is its label. $X_U$ consists of a total of nu unlabeled data points: $x_U^1$, $x_U^2, \ldots, x_U^{nU}$, In both cases, each input sample, $x_K^i$ (for $K \in (L, U)$) comprises four input sub-sets: post text ($x_{TT}^i$), external knowledge text ($x_{EK}^i$), post features ($x_{TF}^i$) and user features ($x_{TT}^i$). In each pass through the model, these four inputs are encoded separately as described below.

In the first stage 210, textual data is encoded. The post text of sequence length N is represented as a one-hot vector of vocabulary size V. A word embedding layer $E \in R^{V \times D}$ transforms the one-hot vector into a dense tensor $e \in R^{N \times D}$ consisting of ($e^1, e^2, \ldots, e^N$). These token vectors are further encoded using a Bidirectional LSTM, the forward and backward layers of which process the N vectors in opposite directions. In addition, the forward LSTM emits a hidden state $h_{ft}$ at each time-step, which is concatenated with the corresponding hidden state $h_{bt}$ of the backward LSTM to produce a vector $h_t \in R^{(2 \times H)}$ by Equation (1) below:

$$h_t = h_{ft} \otimes h_{bt}, \forall t \in [1, N]$$

where H is the hidden size of each LSTM layer. At each layer, a final state output $f_k \in R^H$ is also obtained ($\forall k \in (f, b)$).

At this stage, a net hidden vector h containing N hidden vectors from the two LSTM layers is combined with the final state vector f using attention across the hidden states, given as Equation (2):

$$v = \sum_{j=1}^{N} a_{ij} h_j; \alpha_{ij} = \text{Softmax}(h_i \cdot f_j)$$

Where $f = f_f \otimes f_b$, $f \in R^{2 \times H}$ and $h = h_1 \ldots \otimes \ldots h_N$, $h \in R^{N,(2 \times H)}$. Vector v, obtained after attention across the hidden states as $v_{TT}$, represents the encoded feature of the post text. In addition, an attention mechanism is used on the output states of the Bi-Directional LSTM, so that the model attends to the most important parts of the text, providing explainability 290. For example, the hidden states corresponding to each token in the input sequence is attended across final output state from the Bi-LSTM resulting in a pooling through the attention mechanism.

Furthermore, as shown in FIG. 2, in second stage 220 sentence BERT is used to find contextual embedding $e_{EK}$ of the external knowledge corresponding to each input batch in order to accommodate the difference between the post text input and the external knowledge text. The $e_{EK}$ vector is then passed through a linear layer to obtain an encoded representation $v_{EK}$ of the external knowledge.

In the third stage 230, post features and user features are encoded following a highly concurrent yet distinct mechanism. First $x_{TF} \in R^{K_t}$ and $x_{UF} \in R^{K_u}$ are passed through separate linear layers which interpolate them to higher dimensional dense feature vectors $v_{TF} \in R^{K_T}$ and $v_{UF} \in R^{K_U}$, respectively. As both $x_{TF}$ and $x_{UF}$ are handcrafted, cross-stitch units are then employed, which not only allow the model to learn the best combination of inputs from both the features and share across multiple layers in the network, but also introduce a common gradient flow path through the non-linear transformation. The transformation produced by cross-stitch is as follows in Equation (3):

$$v_j' = \alpha_{ij} \cdot v_j + \beta_i, \forall i, j \in (1, K_T + K_U)$$

where $\alpha_{ij}$ and $\beta_i$ denote the weights of the fully connected layer performing the cross-stitch operations. The two outputs of the cross-stitch are denoted by $v_{TU}$ and $v_{UT}$, respectively. The shape of the two vectors remains unchanged after this transformation.

Referring next to the fourth stage 240a and 240b, concatenation of $v_{TT}$ and $v_{TU}$, which are the transformed feature vectors of the post text $x_{TT}$ and post features $x_{TF}$, occurs. This produces $v_T = v_{TT} \otimes v_{TU}$, a concatenated representation of all textual features. This is done considering the inherent similarity between the post text and the post features over user features. Affine transformations of the three vectors, $v_T$, $v_{EK}$ and $v_{UT}$, are performed through separate feed-forward linear layers and concatenated to obtain the final decoded vector v, effectively containing transformed feature representations from all of the inputs. The vector v is then downscaled using a fully-connected network and regularized using dropout before finally obtaining the probability distribution across the two classes via Equation (4) below:

$$p(y|x; \theta) = \text{Softmax}(v') = \text{Softmax}(\|v_T\|v_{UT}\|')$$

where, v' represents the transformed vector after it passes through the respective feed forward sub-network, and $\theta$ represents the model parameters at the current time (referred to hereinafter as f(x)).

Returning to the third stage 230, it can be seen that following the dropout of both post features 206 and user features 208, a cross-stitch process 232 is performed. Cross-stitching facilitates the model learning an optimal combination of information sharing. For example, while direct concatenation of features could lead to improper learning due to overpowering of few sets of features over features with lower dimensions, a cross-stitch between interpolations of posts and user features enables the model to find the optimal combinations of the two and also to develop a common gradient path during the training phase.

Thus, each of the model components (cross-stitch, attention, concatenation, and feed-forward) work together to provide an architecture capable of effective, accurate misinformation detection. In one embodiment, cross-stitching is optimized with respect to the aspects of the content (e.g., post and user features) when one output of the cross-stitch is combined in the early stages of the network and the other output is fused in a later stage. For example, in one set of experiments, the cross-stitch was introduced between the encoded representation of the post text, obtained after passing it through Bi-LSTM, and a concatenated form of post and user features. A considerable difference in the performance is observed between the two, the former being the superior one, due to the encoded representation of the post text being considerably different from the additional features, while the features in themselves are very similar. Furthermore, because post features are inherently more similar to the post text, the cross-stitch output corresponding to the post features is first concatenated to the encoded post text and lastly with the user features.

In different embodiments, the verification model performed well with fewer labeled data by learning the semantics and meanings from unlabeled data. Adversarial examples were generated on the input by adding an adversarial noise, conditioned on the L2 norm of the loss gradient to the input, to increase the generalizability of the model. A mixed objective function can be used in supervised and unsupervised fashion, where supervised losses include adversarial loss and/or maximum likelihood loss, and unsupervised loss includes virtual adversarial loss.

With respect to training of the model, in some embodiments, a mixed objective function, which is a weighted sum of both supervised and unsupervised losses based on $L_{MIXED} = \lambda_{ML} L_{ML} + \Delta_{AT} L_{AT} + \lambda_{VAT} L_{VAT}$ can be used. The losses are as follows: (i) $L_{ML}$ represents maximum likelihood loss and minimizes the loss between the predicted and true labels, and (ii) $L_{AT}$ represents the Adversarial Training Loss which introduces a regularization with model training by adding a denoising objective. The semi-supervised process is presented as Equations (7a), (7b), and (7c) below:

$$L_{ML}(\theta) = \frac{-1}{m_\ell} \sum_{i=1}^{m_\ell} \sum_{k=1}^{K} \mathbb{1}(y^{(i)} = k) \log p(y^{(i)} = k \mid x^{(i)}; \theta)$$

$$L_{AT}(\theta) = \frac{-1}{m_\ell} \sum_{i=1}^{m_\ell} \sum_{k=1}^{K} \mathbb{1}(y^{(i)} = k) \log p(y^{(i)} = k \mid v^{*(i)}; \theta)$$

$$L_{VAT}(\theta) = \frac{1}{m} \sum_{i=1}^{m} D_{KL}(p(.\mid v^{(i)}; \theta) \parallel p(.\mid v^{*(i)}; \theta))$$

The training is directed toward increasing the robustness of the model in particular to adversarial perturbations in the input. This characteristic is especially useful in misinformation detection as it allows the model to attend to a wide spectrum of messages with minor variations to improve the generality. An adversarial signal $r_{adv}$, defined in terms of the $L_2$ norm on the gradient $g_L$ with current model parameters, is used to perturb the word embedding inputs e of $x_{TT}$, e*=e+$r_{adv}$, even when this perturbation depends upon the gradient computed over the output with respect to all of the labeled inputs $x_L$.

Furthermore, the $L_{AT}$ objective function in Equation (8) below, $$L_{AT} = \frac{-1}{n_L} \sum_{i=1}^{n_L} P + Q$$

where P=$y_i$ log(h(E($x_i$))+$r_{adv}$) and Q=(1-$y_i$)log(1-f(h(E($x_i$)+$r_{adv}$))) is given as a modification of $L_{ML}$, reflected by both Equation (9):

$$L_{ML} = \frac{-1}{n_L} \sum_{i=1}^{n_L} y_i \log(f(x_i)) + (1 - y_i) \log(1 - f(x_i))$$

and Equation (10):

$r_{adv} = \epsilon_L / \|g_L\|_2 ; g_L = -\nabla_{x_L} \log(f(x_L))$

It can be observed that the above two objectives require knowledge of the true label of the data input, and pertains to the labeled data only. In some embodiments, in order to expand the concept of adversarial training to unlabeled data, a virtual adversarial training loss LV AT aimed to add robustness against adversarial inputs is incorporated. The perturbation on the word embedding e is applied, and $r_{adv}$ is now defined by Equation (11):

$r_{v\text{-}adv} \models \epsilon g / \|g\|_2 ; g = -\nabla_x KL[f(x) \| h(E(x)+\delta)]$ In this case, $\delta$ represents a small random perturbation vector, using a 2nd-order Taylor series expansion followed by the power iteration method. The VAT loss is then defined as in Equation (12):

$$L_{VAT} = \frac{1}{n_L + n_U} \sum_{i=1}^{n_L+n_U} KL[f(x) \parallel h(E(x) + r_{v\text{-}adv})]$$

In this case, f(x)=h(E(x)), where E(x)∈RN×D is the word embedding vector.

Figure 3:
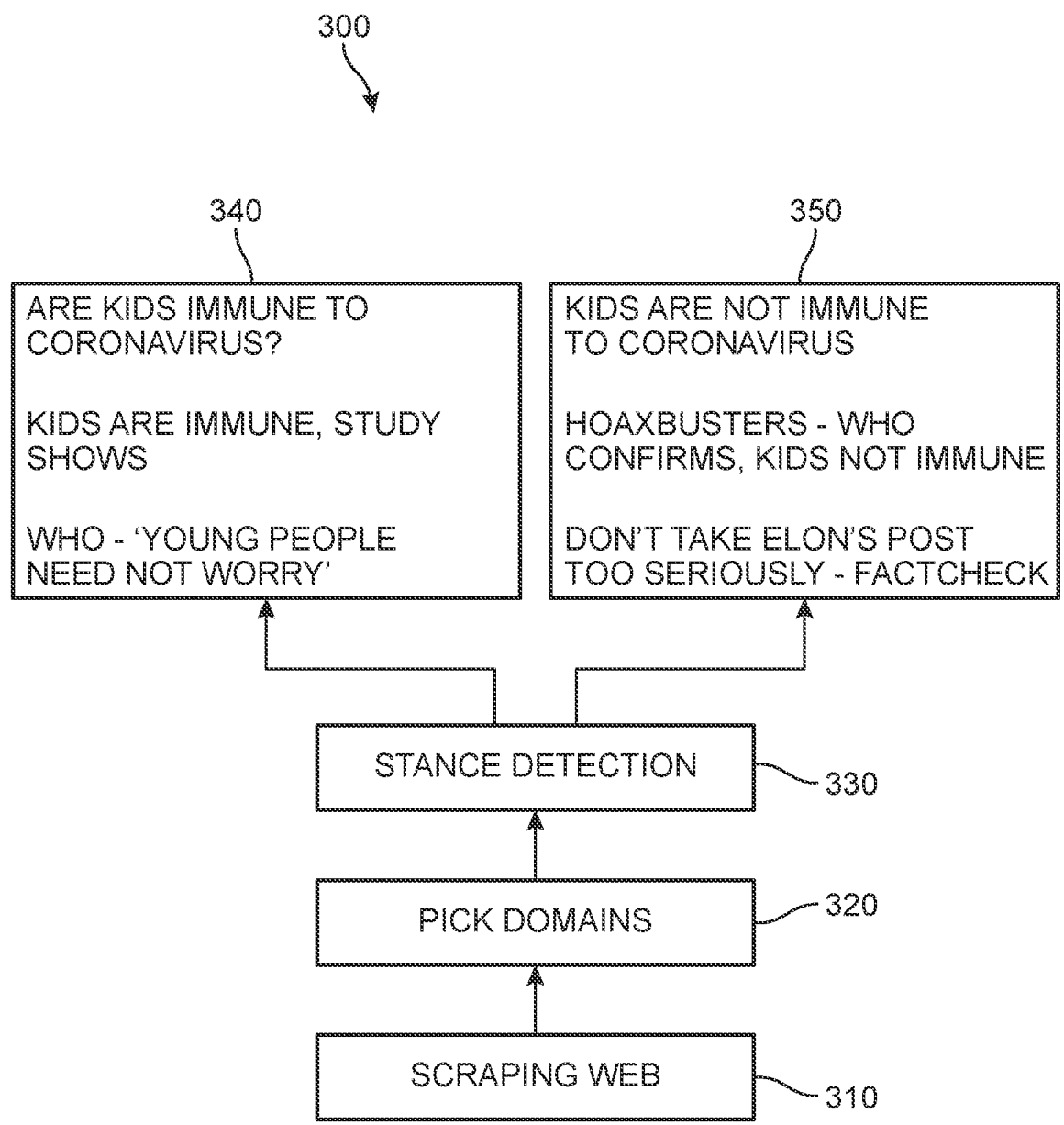
FIG. 3 is a schematic flow diagram of a stance detection process for obtaining external data, according to an embodiment.

In FIG. 3, a flow diagram 300 depicts the use of external knowledge in a real-time multi-step process to create a model robust to emerging misinformation using external information. In a first step 310, an input post text is processed contextually to a shortened query which is used as a phrase to scrape from a web search engine (e.g., Google® Search, Google® News, MS® Bing, etc.). In a second step 320, the appropriate domain is selected for the information (i.e., the category of information under which the content should fall). Stance detection is then applied in a third step 330 to categorize whether the information should fall under false data sources 340 or true data sources 350, examples of which are shown in FIG. 3. The information from the most reliable sources is extracted and is used as external knowledge for the model.

Figure 4:
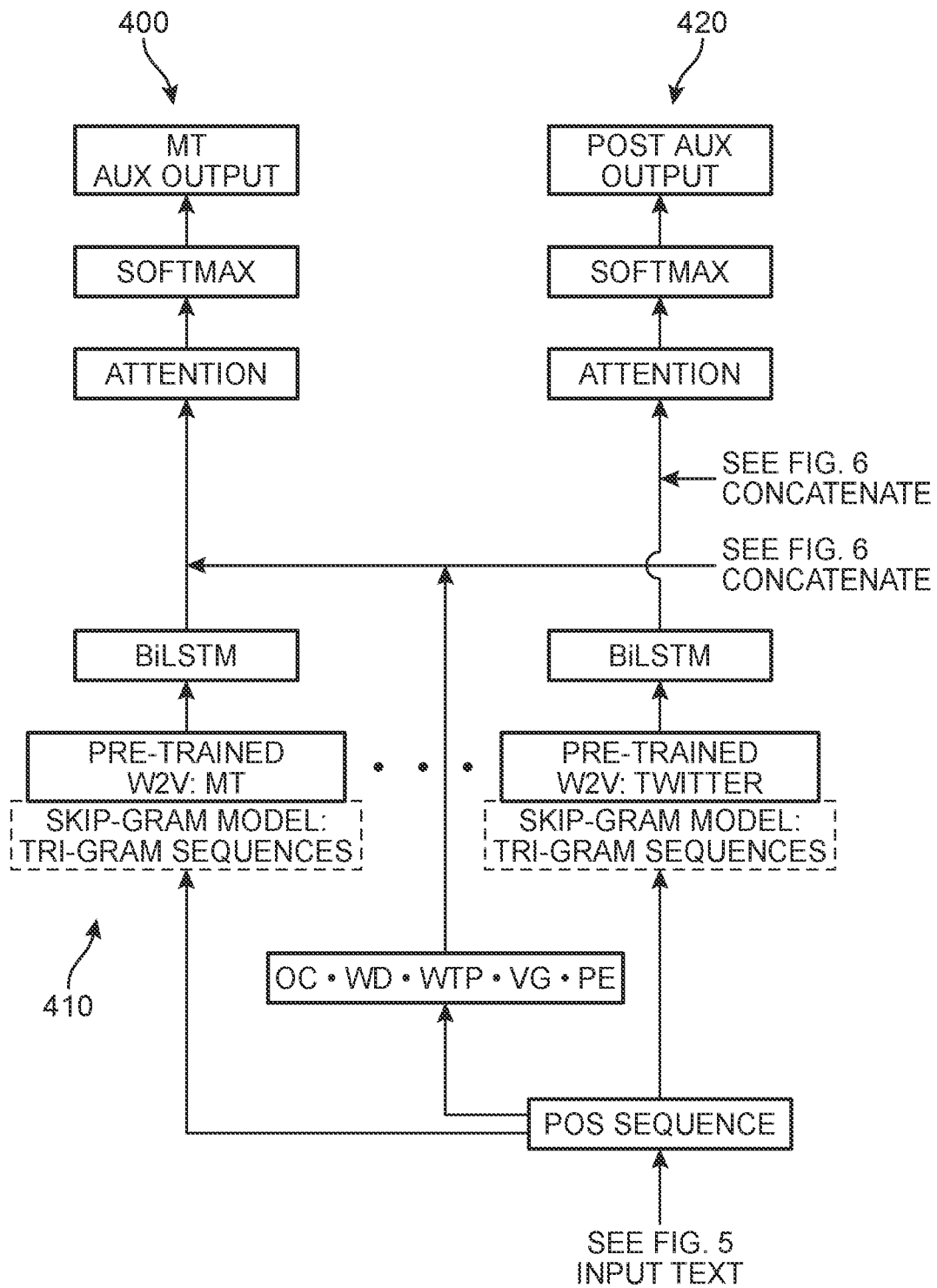
FIGS. 4-6 collectively refer to a schematic diagram for classification of claims, according to an embodiment.
Figure 5:
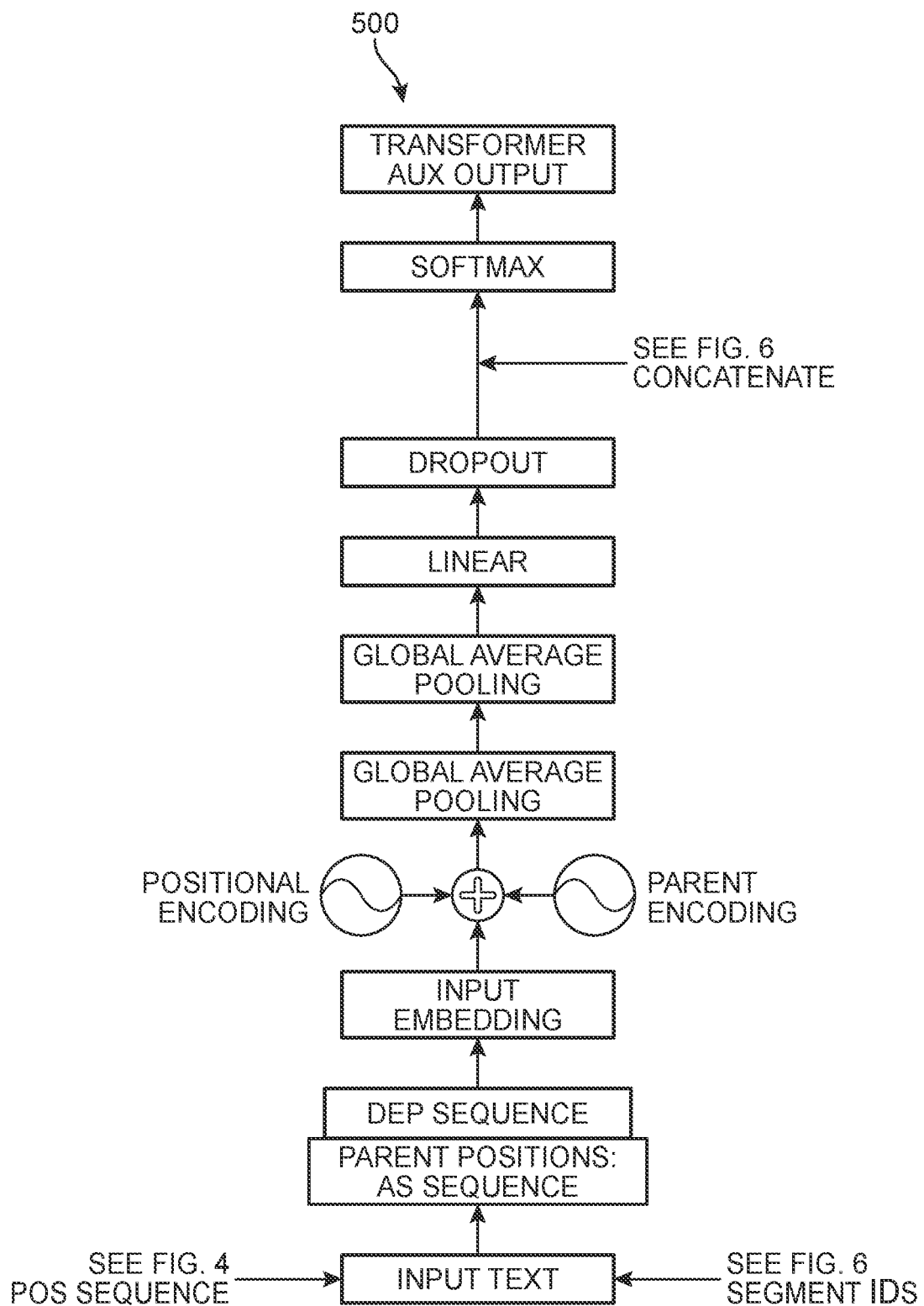
Figure 6:
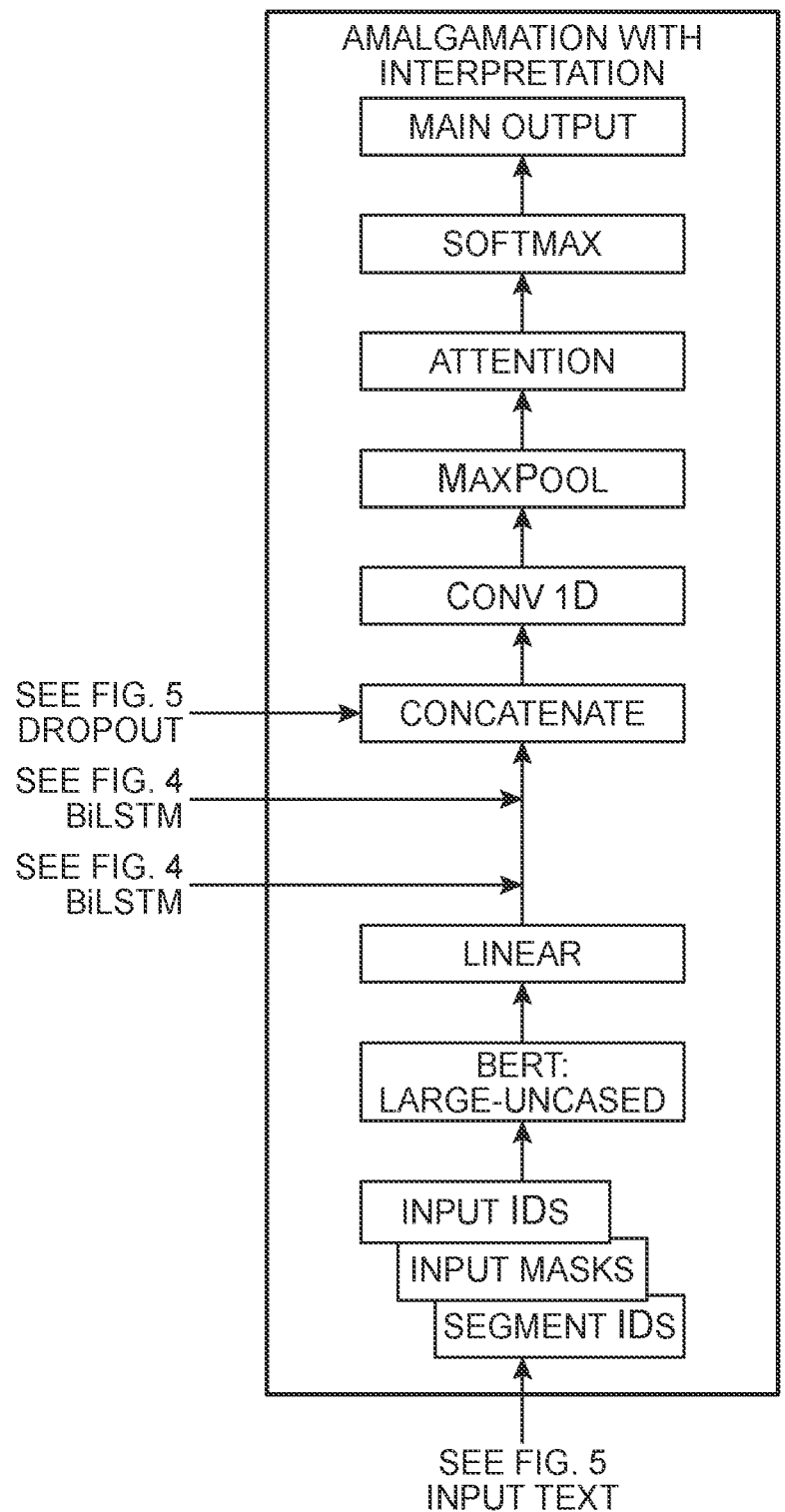

Referring next to the sequence of FIGS. 4-6, a schematic architecture for claim detection is shown in which processes including speech encapsulation 400, dependency parsing 500, and amalgamation with interpretation 600. The proposed architecture is configured to perform structural encapsulation, with a transformer architecture to abridge dependency features. This allows the model to consider unstructured noisy text. In FIG. 4, a flow diagram for speech encapsulation can be seen to include two processes, whereby text is inputted (see FIG. 5). For example, a sample text sequence $w_1$ $w_2$ $w_3$ $w_4$ ... $w_n$ will be converted to a POS (part of speech) sequence $p_1$ $p_2$ $p_3$ $p_4$ ... $p_n$. Sequence tri-grams are then extracted to obtain ($p_1$ $p_2$ $p_3$) ($p_2$ $p_3$ $p_4$) ... ($p_{n-1}$ $p_{n-2}$ $p_n$). The tri-gram as an individual token is provided as $p_i$ $p_{i+1}$ $p_{i+2}$=$t_i$. The skip-gram model is then trained by the tri-gram token. Thus, one model each will be used to encapsulate the structure from various text distributions, as shown in Equation (13):

$$L(\Theta) = \prod_{t=1}^{T} \prod_{-m \leq j \leq m; j \neq 0} P(w_{t+j} \mid w_t; \Theta)$$

In addition, as depicted by the flow diagram of FIG. 5, dependency parsing 500 is also performed. For example, a sample text sequence w1 w2 w3 w4 ... wn will be converted to a dependency (DEP) sequence d1 d2 d3 d4 ... dn. However, it can be appreciated that in such a case, dependencies are not assigned to a word, but to a tuple. Thus, for purposes of the architecture presented herein, the process further includes a transformer encoding step of encoding the position of the parent node in a sequence, until a final representation d1 d2 d3 d4 ... dn and pp1 pp2 pp3 pp4 ... ppn is obtained, where d is the incoming dependency edge of child token and pp=index of the associated parent token.

Finally, while previous approaches (especially for unstructured text) toward amalgamation with interpretation have been constrained to BERT or RoBERTa, the proposed architecture is configured to encapsulate raw context (using BERT-large-uncased) with structural information to perform a final prediction. An overview of this process is depicted in the flow diagram of FIG. 6.

Figure 7:
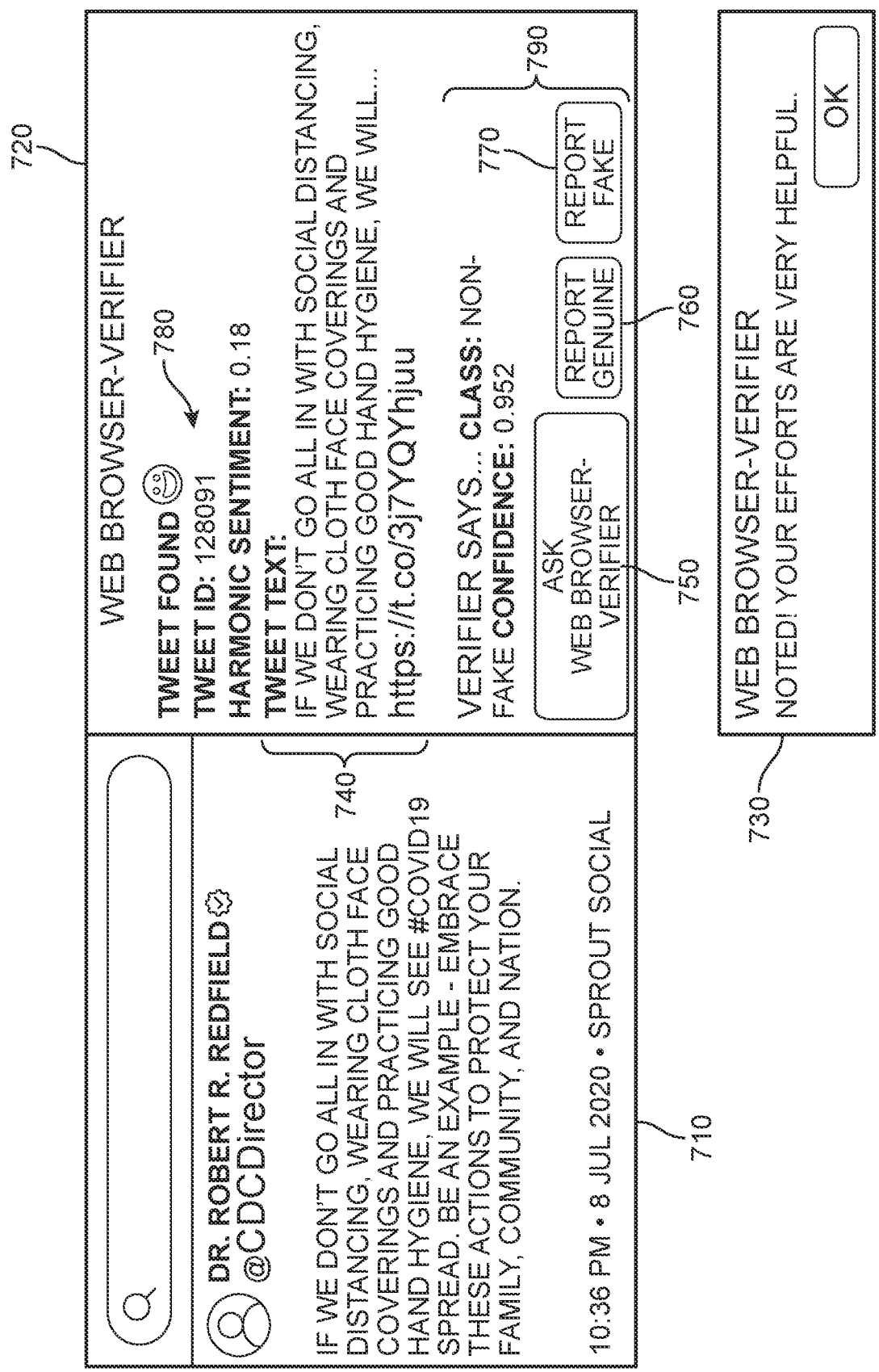
FIG. 7 is an example of the proposed system being implemented as an extension installed on a web browser and used to verify a Tweet®, according to an embodiment.

Referring now to FIG. 7, another example of an implementation of the proposed systems is presented. An authentic Tweet® 710 by the CDC (Center for Disease Control) Director is shown as a 'genuine' Tweet®. In different embodiments, the web browser by which a user accesses the internet can include various types of extensions, generally comprising software programs built on web technologies that enable users to customize their browsing experience. An extension can be selected by a user and installed into the web browser. The extension may be used to provide additional functionality to the browser. In some embodiments, the proposed system can be implemented as such an extension, for example as a Google Chrome™ extension, or other web browsers such as Edge®, Firefox®, Safari®, Explorer®, etc.

In different embodiments, the extension is configured to execute an end-to-end model which enables for identification of fake posts or other content in real time. Offering end-users a convenient truth-verification mechanism that is available through the very browser being used to access the suspicious content can greatly facilitate the detection of misinformation. In some embodiments, "Web Browser-Verifier" is deployed as an extension that replicates the performance of the model while also offering other features. In one specific example, the extension is based on Chrome®, which uses jQuery9 to send and receive requests via a POST API method. The verification model can be implemented using Flask10 in local servers which can receive the POST API requests concurrently. To handle the load balancing over multiple concurrent requests, Redis11 can be used. Thus, the server is not burdened with resource intensive requests, and the combination of Flask and Redis performs efficient communication through APIs.

As shown in FIG. 7, in cases where the content is tweet-based, a user interface for a "Chrome"-Verifier extension 720 is configured to first identify the Tweet® ID through the URL while scanning Twitter®. In this example, a Tweet® ID 780 is then sent to the server using an API. In some embodiments, the extension also provides the option to enter the Tweet® ID 780 manually. Upon receiving a request via the extension, the raw data is first transformed to the necessary format and then passed through the model. The detected class along with its confidence from the Softmax layer is returned back to the extension and displayed. FIG. 7 shows the working of the extension, where the extraction of the Tweet® is performed on the browser side and is instant (e.g., extracting Tweet® text 740), whereas in a later stage 790, verification of the Tweet® is performed. In some embodiments, the verification takes on an average of 1.2 seconds per Tweet® (single API request).

For purposes of this disclosure, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, selectable options or buttons, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

Furthermore, in different embodiments, user feedback on the final classification output generated by the model may be obtained via a feedback mechanism comprising one or more selectable options. In FIG. 7, a first option 750 ("Ask for Verification") for requesting additional information, a second option 760 ("Report Genuine") for agreeing with the classification, and a third option 770 ("Report Fake") for disagreeing with the classification are depicted. In some embodiments, the model can accept the user's response (genuine or fake) as actual truth and apply it as an updated label in the extended online dataset. As shown in FIG. 7, in one example, once a user submits feedback, an additional display 730 can be presented acknowledging and thanking the user. In addition, in some embodiments, an online training mechanism based on user feedback in cases where the feedback differs from the model's classification can trigger a check on the confidence of the model. In the example shown, users can express their opinion on the model's output by either supporting the prediction or contradicting it. Online learning can be performed by consideration of those responses by the users for which the confidence score of the model on that input originally fell below a certain threshold (e.g., below 0.5, 0.4, etc.). Thus, the model is trained during inference with the input being the query post and the output being the user's label. In some embodiments, training based on online learning is processed using Equation (13) below:

$$\Theta_{t+1}^{(l)} \leftarrow \Theta_t^{(l)} - \eta \nabla_{\Theta_t^{(l)}} \mathcal{L}(F(x_t, y_t)) = \Theta_t^{(l)} - \eta \alpha^{(l)} \nabla \Theta_t^{(l)} \mathcal{L}(f^{(l)}, y_t)$$

As one specific example, the model is trained only if the confidence is lower than 0.6. During testing of the extension, user feedback indicated that 203 out of 215 ratings were positive, i.e., reinforcing the prediction by "Chrome"-Verifier as correct, resulting in an accuracy of 94% and F1 Score of 94.3%. Such a high level of accuracy on a diverse set of inputs underlines the model's ability to select appropriate input features when making a prediction.

As described herein, a vast amount of unlabeled data was used to train a neural attention model in a semi-supervised fashion to identify the semantic structures of language. External knowledge for the content (e.g., Tweets®) was collected by determination of the most relevant stance from credible sources on the web, as external knowledge from a trusted source can facilitate the classification. The neural attention model—which is configured to receive various inputs such as post text, post features, user features and external knowledge for each post—employs cross-stitch units for optimal sharing of parameters among post features and user features. As post text and post features are closely related, optimal sharing of information was enabled by concatenating one output of cross-stitch early in the network and the other in a later stage. Furthermore, in different embodiments, maximum likelihood techniques and adversarial training are used for supervised loss, while virtual adversarial training is used for unsupervised loss. It can be appreciated that usage of adversarial losses further adds regularization and robustness to the model. The model is incorporated into the verification model, a novel cross-stitch model which performs under a semi-supervised setting by leveraging both unlabeled and labelled data with optimal data sharing across various content.

Figure 8:
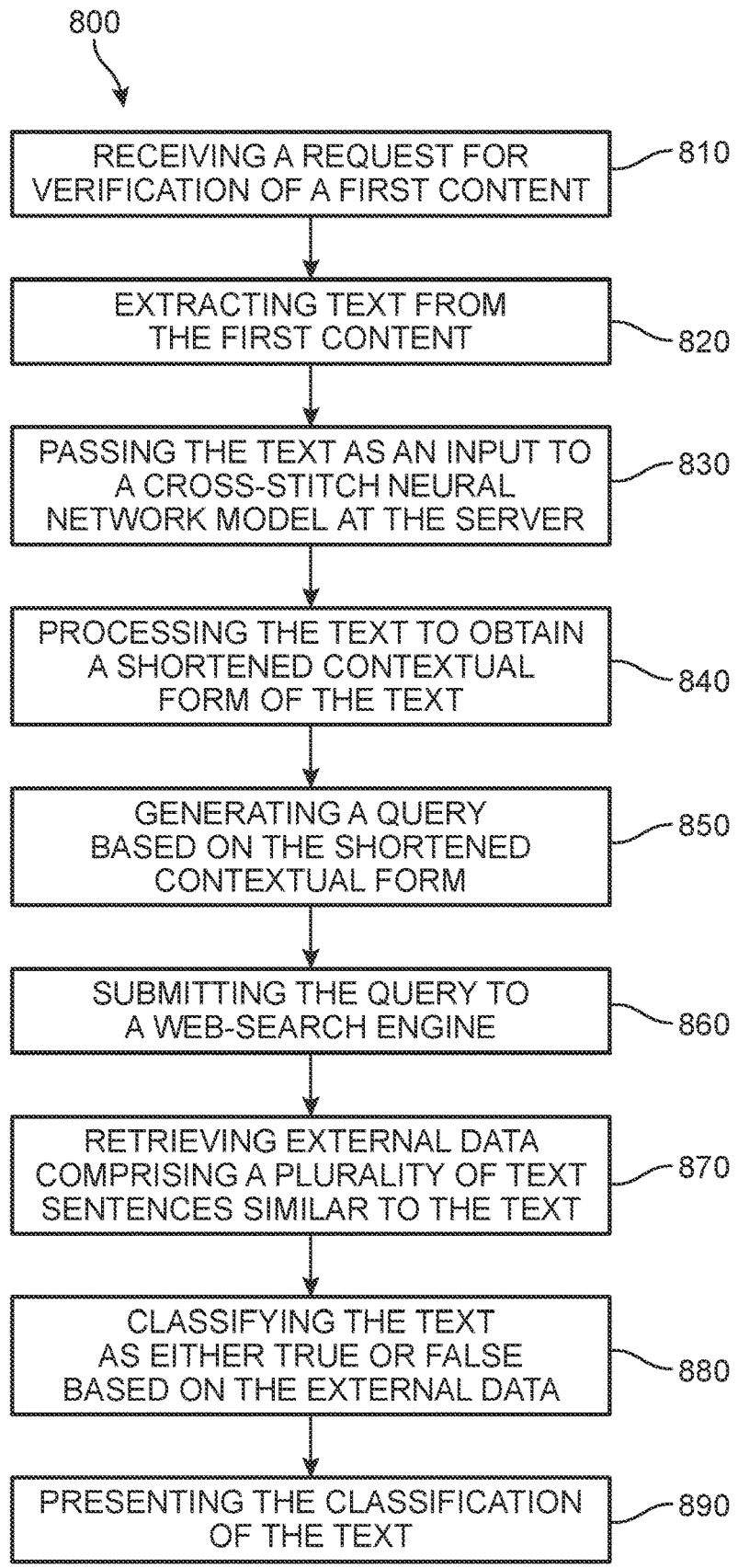
FIG. 8 is a flow diagram presenting a method of detecting misinformation, according to an embodiment.

FIG. 8 is a flow chart illustrating an embodiment of a method 800 of detecting false media content online. The method includes a first step 810 of receiving, from a computing device and at a cloud-based server, a first request for verification of a first content, and a second step 820 of extracting, at the server, text from the first content. A third step 830 includes passing the text as an input to a cross-stitch neural network model at the server, and a fourth step 840 includes processing, via text processing techniques associated with or provided by the cross-stitch neural network model, the text to obtain a shortened contextual form of the text. The method 800 also includes a fifth step 850 of generating, via the cross-stitch neural network model, a query based on the shortened contextual form, a sixth step 860 of submitting, from the server, the query to a web-search engine, and a seventh step 870 of retrieving, from the web-search engine and via the server, external data comprising a plurality of text sentences similar to the text. In addition, the method 800 includes an eighth step 880 of classifying, via the cross-stitch neural network model, the text as either true or false based on the external data, and a ninth step 890 of presenting, at a display for the computing device, the classification of the text, such as via a graphical user interface associated with an extension installed on the web browser.

In other embodiments, the method may include additional steps or aspects. For example, the step of retrieving the plurality of text sentences can be based on a cosine similarity of BERT sentence embeddings of the text and each text sentence. In another example, the first content refers to a posting on a social media platform, and input to the cross-stitch neural network model further comprises social media features including one or more of a number of hashtags associated with the first content, a number of times the first content was favorited, a number of times the first content was re-posted by other members of the platform, a number of URLs present in the first content, and a sentiment of the text. In some embodiments, the first content refers to a posting by a member of a social media platform, and input to the cross-stitch neural network model further comprises member features including one or more of a verified status of the member, a number of postings by the member, a number of postings in the last week by the member, and an average duration between postings by the member.

In another embodiment, the external data is limited to text sentences obtained from trusted sources including one or more of fact-checking sites and government organizations. In some examples, the cross-stitch neural network model employs cross-stitch units to determine an optimal combination of inputs into the cross-stitch neural network model, the inputs including the text, external data, posting author metadata, and posting metadata. In such cases, the inputs can include the text, external data, posting author metadata, and posting (i.e., social media platform) metadata. In one embodiment, the method can also include a step of training, via unsupervised learning and adversarial loss techniques, the cross-stitch neural network model on unlabeled data. In some embodiments, the first content is accessed at the computing device via a web browser. In such cases, functions of the cross-stitch neural network model may be accessed via an extension installed on the web browser.

It may be appreciated that, as misinformation continues to be disseminated, embodiments of the model can be used to classify the content, even if the model is not trained on that particular type of misinformation topic. In other words, the verification model has been shown to be highly effective, even when implemented in real-time by general users accessing information through the Chrome® browser. In some embodiments, Chrome-Verifier, a chrome extension based on the verification model to flag fake Tweets®, can be configured to handle vast amounts of concurrent requests.

Figure 9:
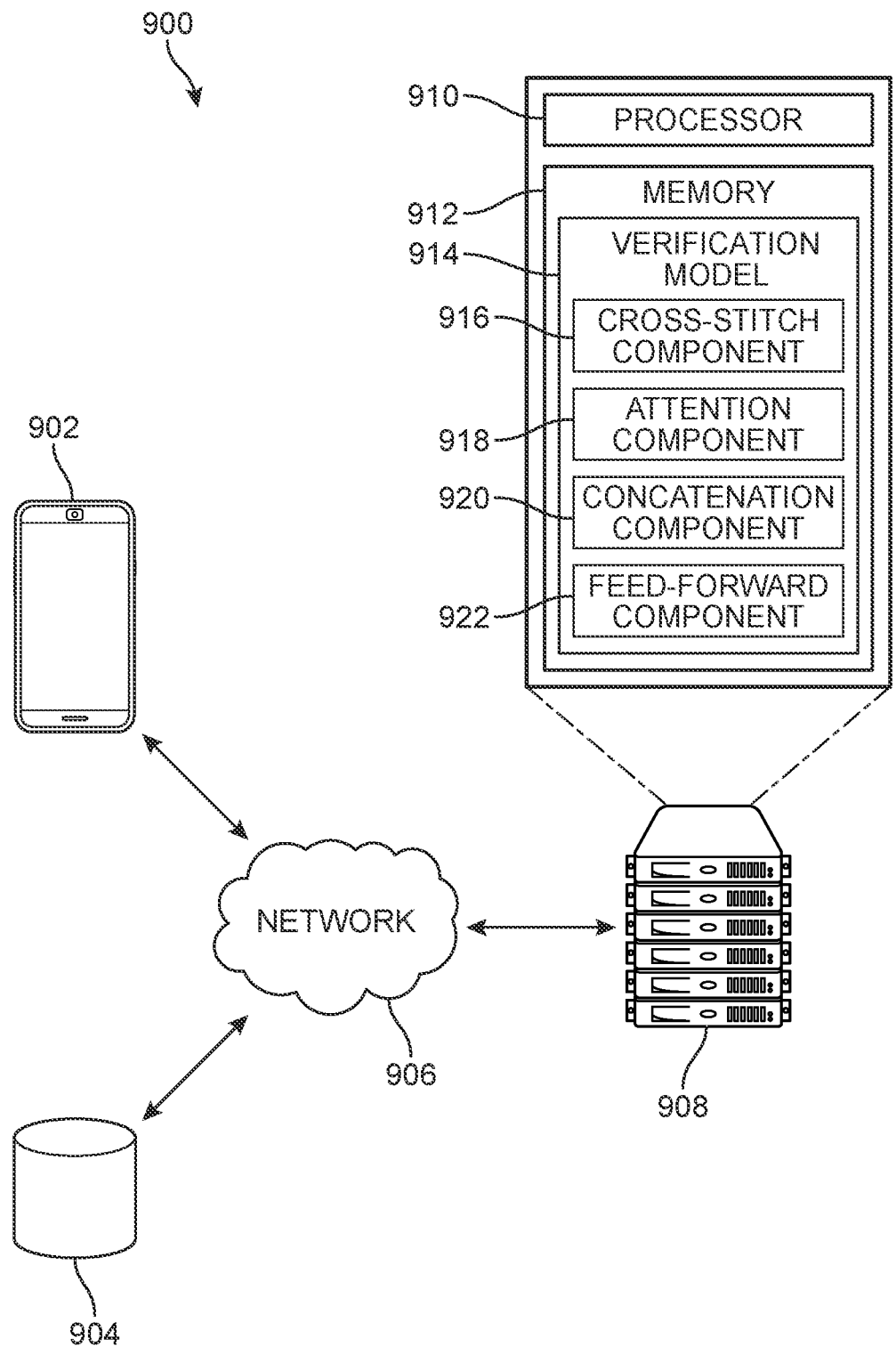
FIGS. 9 and 10 are diagrams depicting example environments and components by which systems and/or methods, described herein, may be implemented.

FIG. 9 is a schematic diagram of a system for misinformation detection 900 (or system 900), according to an embodiment. The disclosed system may include a plurality of components capable of performing the disclosed method of content verification (e.g., method 800). For example, system 900 includes a user device 902, a computing system 908, and a database 904. The components of system 900 can communicate with each other through a network 906. For example, user device 902 may retrieve information from database 904 via network 906. In some embodiments, network 906 may be a wide area network ("WAN"), e.g., the Internet. In other embodiments, network 906 may be a local area network ("LAN").

As shown in FIG. 9, a model engine 914 may be hosted in computing system 908, which may have a memory 912 and a processor 910. Processor 910 may include a single device processor located on a single device, or it may include multiple device processors located on one or more physical devices. Memory 912 may include any type of storage, which may be physically located on one physical device, or on multiple physical devices. In some cases, computing system 908 may comprise one or more servers that are used to host security engine 914.

While FIG. 9 shows one user device, it is understood that one or more user devices may be used. For example, in some embodiments, the system may include two or three user devices. The user may include an individual seeking to have their identification authenticated (e.g., for securely interacting with a bank, insurance company, or other business) by live video. In some embodiments, the user device may be a computing device used by a user. For example, user device 902 may include a smartphone or a tablet computer. In other examples, user device 902 may include a laptop computer, a desktop computer, and/or another type of computing device. The user devices may be used for inputting, processing, and displaying information. In some embodiments, a digital camera may be used to generate live video images used for analysis in the disclosed method. In some embodiments, the user device may include a digital camera that is separate from the computing device. In other embodiments, the user device may include a digital camera that is integral with the computing device, such as a camera on a smartphone, laptop, or tablet.

Referring to FIG. 9, system 900 may further include a database 904, which stores training data and/or live data captured by device 902 as well as external data. This data may be retrieved by other components for system 900.

As discussed above, model engine 914 may include a cross-stitch component 916, an attention component 918, a concatenation component 920, and a feed-forward component 922. Each of these components may be used to perform the operations described herein.

Figure 10:
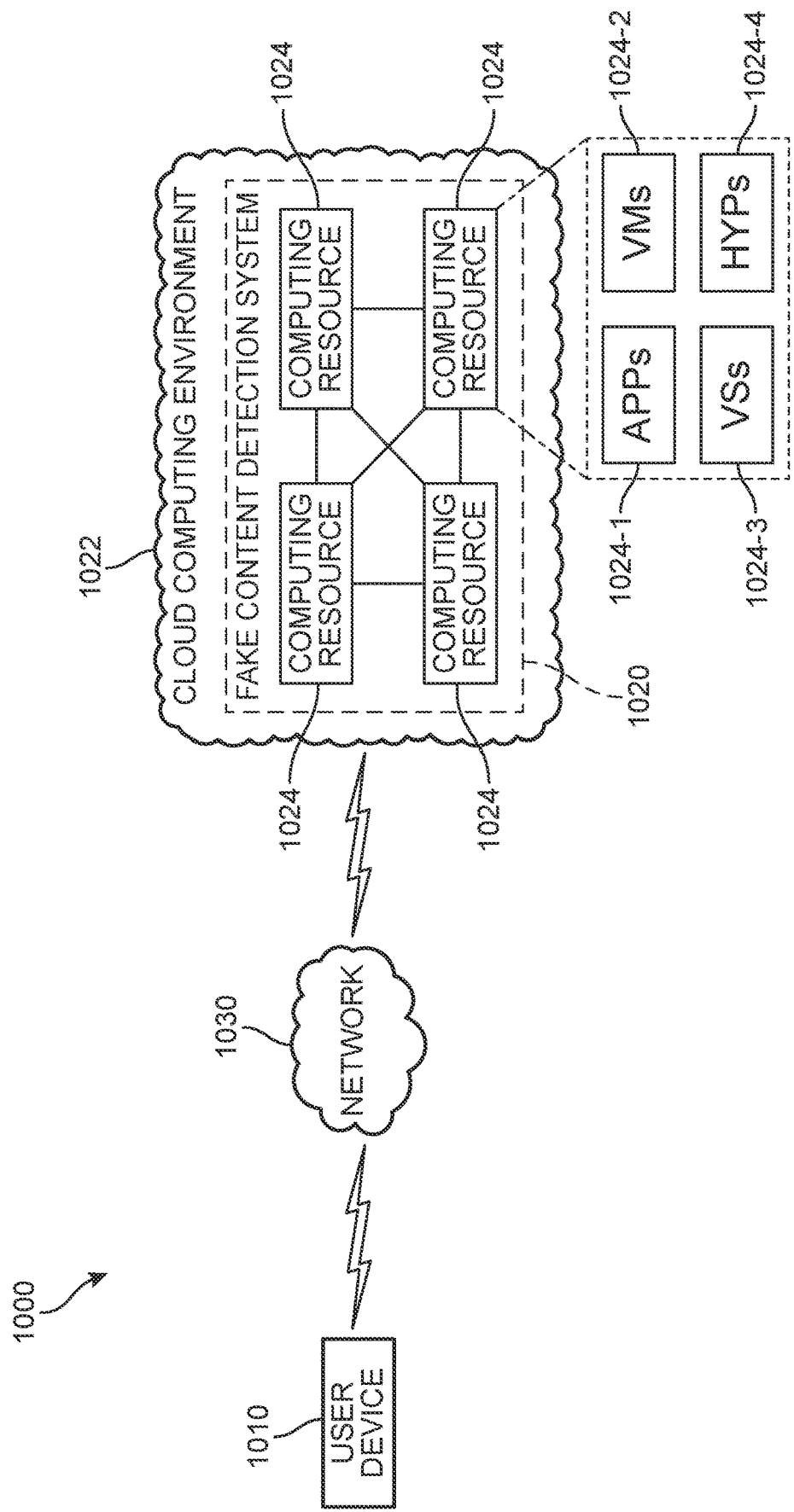

FIG. 10 is a diagram of an example environment 1000 in which systems and/or methods, described herein, may be implemented. As shown in FIG. 10, environment 1000 may include a user device 1010, a fake content detection system 1020, and a network 1030. Devices of environment 1000 may interconnect via wired connections, wireless connections, or a combination of wired and wireless connections.

User device 1010 includes one or more devices capable of receiving, generating, storing, processing, and/or providing information, such as information described herein. For example, user device 1010 may include a mobile phone (e.g., a smart phone, a radio, telephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 1010 may receive information from and/or transmit information to fake content detection system 1020.

Fake content detection system 1020 includes one or more devices that extracts features from online content and determines whether such features represent a high likelihood of misinformation. In some implementations, fake content detection system 1020 may be designed to be modular such that certain software components may be swapped in or out depending on a particular need. As such, fake content detection system 1020 may be easily and/or quickly reconfigured for different uses. In some implementations, fake content detection system 1020 may receive information from and/or transmit information to one or more user devices 1010.

In some implementations, as shown, fake content detection system 1020 may be hosted in a cloud computing environment 1022. Notably, while implementations described herein describe fake content detection system 1020 as being hosted in cloud computing environment 1022, in some implementations, fake content detection system 1020 may not be cloud-based (i.e., may be implemented outside of a cloud computing environment) or may be partially cloud-based.

Cloud computing environment 1022 includes an environment that hosts fake content detection system 1020. Cloud computing environment 1022 may provide computation, software, data access, storage, etc. services that do not require end-user knowledge of a physical location and configuration of system(s) and/or device(s) that hosts fake content detection system 1020. As shown, cloud computing environment 1022 may include a group of computing resources 1024 (referred to collectively as "computing resources 1024" and individually as "computing resource 1024").

Computing resource 1024 includes one or more personal computers, workstation computers, server devices, or other types of computation and/or communication devices. In some implementations, computing resource 1024 may host fake content detection system 1020. The cloud resources may include compute instances executing in computing resource 1024, storage devices provided in computing resource 1024, data transfer devices provided by computing resource 1024, etc. In some implementations, computing resource 1024 may communicate with other computing resources 1024 via wired connections, wireless connections, or a combination of wired and wireless connections.

As further shown in FIG. 10, computing resource 1024 includes a group of cloud resources, such as one or more applications ("APPs") 1024-1, one or more virtual machines ("VMs") 1024-2, virtualized storage ("VSs") 1024-3, one or more hypervisors ("HYPs") 1024-4, and/or the like.

Application 1024-1 includes one or more software applications that may be provided to or accessed by user device 1010. Application 1024-1 may eliminate a need to install and execute the software applications on user device 1010. For example, application 1024-1 may include software associated with fake content detection system 1020 and/or any other software capable of being provided via cloud computing environment 1022. In some implementations, one application 1024-1 may send/receive information to/from one or more other applications 1024-1, via virtual machine 1024-2.

Virtual machine 1024-2 includes a software implementation of a machine (e.g., a computer) that executes programs like a physical machine. Virtual machine 1024-2 may be either a system virtual machine or a process virtual machine, depending upon use and degree of correspondence to any real machine by virtual machine 1024-2. A system virtual machine may provide a complete system platform that supports execution of a complete operating system ("OS"). A process virtual machine may execute a single program, and may support a single process. In some implementations, virtual machine 1024-2 may execute on behalf of a user (e.g., a user of user device 1010 or an operator of fake content detection system 1020), and may manage infrastructure of cloud computing environment 1022, such as data management, synchronization, or long-duration data transfers.

Virtualized storage 1024-3 includes one or more storage systems and/or one or more devices that use virtualization techniques within the storage systems or devices of computing resource 1024. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1024-4 may provide hardware virtualization techniques that allow multiple operating systems (e.g., "guest operating systems") to execute concurrently on a host computer, such as computing resource 1024. Hypervisor 1024-4 may present a virtual operating platform to the guest operating systems, and may manage the execution of the guest operating systems. Multiple instances of a variety of operating systems may share virtualized hardware resources.

Network 1030 includes one or more wired and/or wireless networks. For example, network 1030 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 10 are provided as an example. In practice, there may be additional devices and/or networks, fewer devices and/or networks, different devices and/or networks, or differently arranged devices and/or networks than those shown in FIG. 10. Furthermore, two or more devices shown in FIG. 10 may be implemented within a single device, or a single device shown in FIG. 10 may be implemented as multiple, distributed devices. Additionally, or alternatively, a set of devices (e.g., one or more devices) of environment 1000 may perform one or more functions described as being performed by another set of devices of environment 1000.

In different embodiments, fake content detection system 1020 may perform one or more processes described herein. Fake content detection system 1020 may perform these processes based on a processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices. Software instructions may be read into memory and/or storage component from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIGS. 9 and 10 are provided as an example. In practice, the system may include additional components, fewer components, different components, or differently arranged components than those shown in FIGS. 9 and 10. Additionally, or alternatively, a set of components (e.g., one or more components) of the system may perform one or more functions described as being performed by another set of components of the system.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted. Also, various modifications and changes may be made within the scope of the attached claims.

We claim:

1. A computer-implemented method of classifying online media content as either true or false using a cross-stitch neural network model, the method comprising:
   receiving, from a computing device and at a cloud-based server, a first request for verification of a first content;
   extracting, at the server, text from the first content;
   passing the text as an input to the cross-stitch neural network model at the server;
   processing, via text processing techniques of the cross-stitch neural network model, the text to obtain a shortened contextual form of the text;
   generating, via the cross-stitch neural network model, a query based on the shortened contextual form;
   submitting, from the server, the query to a web-search engine;
   retrieving, from the web-search engine and via the server, external data comprising a plurality of text sentences similar to the text;
   classifying, via the cross-stitch neural network model, the text as either true or false based on the external data; and
   presenting, at a display for the computing device, the classification of the text.

2. The method of claim 1, wherein the step of retrieving the plurality of text sentences is based on a cosine similarity of BERT sentence embeddings of the text and each text sentence.

3. The method of claim 1, wherein the first content refers to a posting on a social media platform, and input to the cross-stitch neural network model further comprises social media features including one or more of a number of hashtags associated with the first content, a number of times the first content was favorited, a number of times the first content was re-posted by other members of the platform, a number of URLs present in the first content, and a sentiment of the text.

4. The method of claim 1, wherein the first content refers to a posting by a member of a social media platform, and input to the cross-stitch neural network model further comprises member features including one or more of a verified status of the member, a number of postings by the member, a number of postings in the last week by the member, and an average duration between postings by the member.

5. The method of claim 1, wherein the external data is limited to text sentences obtained from trusted sources including one or more of fact-checking sites and government organizations.

6. The method of claim 1, wherein the cross-stitch neural network model employs cross-stitch units to determine an optimal combination of inputs into the cross-stitch neural network model, the inputs including the text, external data, posting author metadata, and posting metadata.

7. The method of claim 1, further comprising training, via unsupervised learning and adversarial loss techniques, the cross-stitch neural network model on unlabeled data.

8. The method of claim 1, wherein the cross-stitch neural network model includes four components comprising a cross-stitch component, an attention component, a concatenation component, and a feed-forward component.

9. The method of claim 1, wherein functions of the cross-stitch neural network model are accessed via an extension installed on a web browser.

10. A non-transitory computer-readable medium storing software comprising instructions executable by one or more computers which, upon such execution, cause the one or more computers to:

receive, from a computing device and at a cloud-based server, a first request for verification of a first content;
extract, at the server, text from the first content;
pass the text as an input to a cross-stitch neural network model at the server;
process, via text processing techniques of the cross-stitch neural network model, the text to obtain a shortened contextual form of the text;
generate, via the cross-stitch neural network model, a query based on the shortened contextual form;
submit, from the server, the query to a web-search engine;
retrieve, from the web-search engine and via the server, external data comprising a plurality of text sentences similar to the text;
classify, via the cross-stitch neural network model, the text as either true or false based on the external data; and
present, at a display for the computing device, the classification of the text.

11. The non-transitory computer-readable medium storing software of claim 10, wherein retrieving the plurality of text sentences is based on a cosine similarity of BERT sentence embeddings of the text and each text sentence.

12. The non-transitory computer-readable medium storing software of claim 10, wherein the first content refers to a posting on a social media platform, and input to the cross-stitch neural network model further comprises social media features including one or more of a number of hashtags associated with the first content, a number of times the first content was favorited, a number of times the first content was re-posted by other members of the platform, a number of URLs present in the first content, and a sentiment of the text.

13. The non-transitory computer-readable medium storing software of claim 10, wherein the first content refers to a posting by a member of a social media platform, and input to the cross-stitch neural network model further comprises member features including one or more of a verified status of the member, a number of postings by the member, a number of postings in the last week by the member, and an average duration between postings by the member.

14. The non-transitory computer-readable medium storing software of claim 10, wherein the external data is limited to text sentences obtained from trusted sources including one or more of fact-checking sites and government organizations.

15. The non-transitory computer-readable medium storing software of claim 10, wherein the cross-stitch neural network model employs cross-stitch units to determine an optimal combination of inputs into the cross-stitch neural network model, the inputs including the text, external data, posting author metadata, and posting metadata.

16. A system for classifying online media content as either true or false using a cross-stitch neural network model, the system comprising one or more computers and one or more storage devices storing instructions that are operable, when executed by the one or more computers, to cause the one or more computers to:
receive, from a computing device and at a cloud-based server, a first request for verification of a first content;
extract, at the server, text from the first content;
pass the text as an input to the cross-stitch neural network model at the server;
process, via text processing techniques of the cross-stitch neural network model, the text to obtain a shortened contextual form of the text;
generate, via the cross-stitch neural network model, a query based on the shortened contextual form;
submit, from the server, the query to a web-search engine;
retrieve, from the web-search engine and via the server, external data comprising a plurality of text sentences similar to the text;
classify, via the cross-stitch neural network model, the text as either true or false based on the external data; and
present, at a display for the computing device, the classification of the text.

17. The system of claim 16, wherein the instructions further cause the one or more computers to train, via unsupervised learning and adversarial loss techniques, the cross-stitch neural network model on unlabeled data.

18. The system of claim 16, wherein the cross-stitch neural network model includes four components comprising a cross-stitch component, an attention component, a concatenation component, and a feed-forward component.

19. The system of claim 17, wherein functions of the cross-stitch neural network model are accessed via an extension installed on the web browser.

20. The system of claim 16, wherein the first content refers to a posting on a social media platform, and input to the cross-stitch neural network model further comprises social media features including one or more of a number of hashtags associated with the first content, a number of times the first content was favorited, a number of times the first content was re-posted by other members of the platform, a number of URLs present in the first content, and a sentiment of the text.

* * * * *